(12) United States Patent
Harrington

(10) Patent No.: US 6,738,159 B2
(45) Date of Patent: May 18, 2004

(54) METHOD AND APPARATUS FOR IMPLEMENTING A TRAPPING OPERATION ON A DIGITAL IMAGE

(75) Inventor: Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/410,286

(22) Filed: Sep. 30, 1999

(65) Prior Publication Data

US 2003/0044065 A1 Mar. 6, 2003

(51) Int. Cl.[7] .................................................. H04N 1/58
(52) U.S. Cl. ........................ 358/1.9; 358/3.26; 358/518; 358/540
(58) Field of Search ................................. 382/167, 266, 382/164; 358/518, 523, 1.9, 540, 3.26

(56) References Cited

U.S. PATENT DOCUMENTS

| 4,986,526 | A |   | 1/1991  | Dastin |  |
|-----------|---|---|---------|--------|--|
| 5,113,249 | A | * | 5/1992  | Yosefi | 358/1.9 |
| 5,276,532 | A |   | 1/1994  | Harrington | |
| 5,583,953 | A |   | 12/1996 | Harrington | |
| 5,644,406 | A |   | 7/1997  | Harrington et al. | |
| 5,682,249 | A |   | 10/1997 | Harrington et al. | |
| 5,684,895 | A |   | 11/1997 | Harrington | |
| 6,130,960 | A | * | 10/2000 | Acharya | 358/525 |
| 6,262,747 | B1 | * | 7/2001 | Rocheleau et al. | 358/1.9 |
| 6,345,117 | B2 | * | 2/2002 | Klassen | 358/518 |

* cited by examiner

Primary Examiner—Amelia M. Au
Assistant Examiner—Colin LaRose
(74) Attorney, Agent, or Firm—Fay, Sharpe, Fagan, Minnich & McKee, LLP

(57) ABSTRACT

This invention relates to a method and apparatus for implementing a trapping operation on a digital image during image processing. More specifically, the invention is directed to implementation of a trapping technique to prevent visual gaps or overlaps between colors on a poorly registered image that is produced by an imaging device, e.g. a color printer. The invention is most advantageously used in an imaging device that incorporates therein a split-level buffer.

13 Claims, 3 Drawing Sheets

METHOD AND APPARATUS FOR IMPLEMENTING A TRAPPING OPERATION ON A DIGITAL IMAGE

BACKGROUND OF THE INVENTION

This invention relates to a method and apparatus for implementing a trapping operation on a digital image during image processing. More specifically, the invention is directed to implementation of a trapping technique to prevent visual gaps or overlaps between colors on a poorly registered image that is produced by an imaging device, e.g. a digital color printer or copier. The invention is most advantageously used in an imaging device that incorporates therein a split-level buffer.

While the invention is particularly directed to the art of performing trapping operations on a digital image in a system having a split level buffer, and will be thus described with specific reference thereto, it will be appreciated that the invention may have usefulness in other fields and applications. For example, the invention may be used in any digital image process where trapping is desired.

By way of background, in generating color pictorial images, a large number of colors and moderate spatial resolution levels are generally required to achieve a high-quality image. Because the eye can detect approximately 100 intensity levels, i.e., for three-color separations, seven bits per color separation per pixel, imaging systems should support at least this number of intensity levels. Generally, however, imaging systems support 256 different intensity levels. The 256 intensity levels supported by an imaging system performing three color separations for a full-color image correspond to eight bits per color separation, i.e., twenty-four bits per pixel. Accordingly, for high-quality renditions of real-life scenes, an imaging system supporting at least 100 intensity levels detectable by the eye requires less than 200 pixels per inch to achieve an image having a sufficient level of spatial resolution.

When material such as textual material and synthetic graphic material is being imaged, the accuracy of color is not nearly so important to achieve a high-quality image, particularly since the color used is generally a constant black. High spatial resolution is, however, needed to provide images having crisp, clear edges.

Known devices have been developed to address the issues involved with the provision of crisp, clear edges. For example, a frame buffer for use in a color imaging system includes a plurality of pixels having a first resolution level. A plurality of bits is provided for each pixel so as to enable accurate pictorial imaging. The frame buffer includes pixels having a resolution level that is higher than the first resolution level. Pixels on the edges of objects being imaged are replaced by the higher resolution pixels to provide images wherein object edges have high-resolution while object interiors have moderate resolution. A single, split-level frame buffer is used so that images having more than one level of resolution do not require the performance of separation and merging operations.

More specifically, referring now to the drawings, and particularly to FIG. 1, a frame buffer 10 is illustrated which includes a pixel 12 of moderate resolution which is to be replaced with a block 14 of higher resolution pixels. Frame buffer 10 supports a large color space, e.g., 256 intensity levels or twenty-four bits per pixel for three color separations required to form a full color image.

The replacement of the pixel 12 having a moderate resolution with a block of higher resolution pixels 14 can be effected in a plurality of different manners. For example, FIG. 2A illustrates the division of bits in a four color-separation imaging system, where 31 bits are used to specify a color. As illustrated in FIG. 2B, in this approach, a first bit can provide a flag instructing the system whether tables should be referenced. Accordingly, if the first bit is one, as illustrated in FIGS. 2B–2C, fifteen bits will be used as a table index 30 to a color entry table 32. This color entry table can be used only when two colors are provided in the expanded pixel. The remaining sixteen bits will be used as a reference 36 to a bit map pattern selecting table 34. The bit map indicates which of the two representative colors should be used with each of the high-resolution pixels. This type of approach requires no more memory capability than a frame buffer having only moderate resolution pixels. It is particularly useful for graphical objects and text where only two colors are present (object color and background); however, the approach can also be used when three colors are present, two colors and an intermediate color are present, etc.

These known frame buffers thus enable pictorial material, textual material and synthetic graphic material to be imaged using a single, split-level frame buffer. Object interiors may be imaged at a moderate resolution level while edges that must be crisp and clear in appearance may be imaged at a higher resolution level using only a single framer buffer. High quality images are obtained without requirements of complex configuration and high bandwidth. Different types of material can be processed simultaneously without requiring, for example, pictorial material to be separated from textual and graphic material and combination of the result in a final imaging stage.

Significantly, when an image containing two abutting colors is printed using three or four primary ink separations (CMY or CMYK) on a device that does not have good registration between separations, the result may be gaps or overlaps along the edge between the two colors. A method to reduce this effect is called trapping and involves printing a mixture of the colors along the edge so that some ink will be present even when alignment is poor. It would be desirable to be able to perform trapping operations in the context of image processing systems having split-level image buffers such as those shown in and described in connection with U.S. Pat. Nos. 5,276,532; 5,583,953; 5,644,406; 5,682,249; and 5,684,895—all of which are incorporated herein by reference.

The present invention contemplates a new technique for implementing trapping operations on a digital image that resolves the above-referenced difficulties and others.

SUMMARY OF THE INVENTION

A method and apparatus for implementing a trapping operation on a digital image during image processing are provided.

In one aspect of the invention, the method includes determining whether a selected picture element has the edge present therein based on an encoding thereof, determining colors present in the selected picture element based on the encoding, determining whether a trapping operation should be performed based on the colors determined to be present in the selected picture element, determining a trapping color to be used for the trapping operation based on the determined colors, obtaining a bitmap indicating a shape of the edge based on the encoding, and performing the trapping operation based on the trapping color and a one of the obtained bit maps.

In another aspect of the invention, determining whether the selected picture element has the edge present therein comprises checking the status of a flag bit.

In another aspect of the invention, determining the colors present in the picture element comprises accessing a look-up table.

In another aspect of the invention, determining whether a trapping operation should be performed comprises accessing a look-up table.

In another aspect of the invention, determining the trapping color comprises accessing a look-up table.

In another aspect of the invention, obtaining the bitmap comprises generating the bitmap based on the encoding.

In another aspect of the invention, obtaining the bitmap comprises accessing a look-up table based on the encoding.

In another aspect of the invention, the apparatus comprises a frame buffer operative to store a plurality of the picture elements—the picture elements each being encoded to indicate whether the edge is present in the each picture element, a table having stored therein data on a plurality of colors—the table being configured such that pairs of the plurality of colors are each associated with a trapping color and the table being selectively addressable based on the encoded picture elements, and a processor operative to determine whether a selected picture element has the edge present therein based on the encoding, determine the colors present in the selected picture element based on the encoding and the pairs of colors stored in the table, determine whether a trapping operation should be performed based on the colors determined to be present in the picture element and the pairs stored in the table, determine which trapping color should be used for the trapping operation based on the pairs of colors stored in the table and the trapping color associated with the each pair of colors stored in the table, and perform the trapping operation based on the trapping color and a one of the generated bit maps.

In another aspect of the invention, a bitmap generator operative to selectively generate bit maps based on the encoded picture elements is provided.

In another aspect of the invention, a second table is provided having stored therein bitmap information, the second table being selectively addressable obtain bit maps based on the encoded picture elements.

In another aspect of the invention, the picture elements are encoded with a flag bit to indicate whether the edge is present.

In another aspect of the invention, the pairs are determined to require trapping based on a comparison of absolute differences to a threshold.

In another aspect of the invention, the trapping color is determined based on an average of the pair associated therewith.

A primary advantage of the present invention is that operations involved with the trapping operation can be carried out efficiently on the tables referenced according to the image buffer encoding, rather than on the image buffer itself.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

As described above, the known split-level image buffers represent an image as an array of blocks or picture elements. The blocks or picture elements may contain a single color or more complex structures such as the edge between two colors. In the known imaging systems using such split-level buffers, blocks containing edges are encoded by providing a pointer to a table entry containing the colors present in the block and according to the shape of the edge. As to shape, for example, one known imaging system uses a 4×4 block to represent portions of the image and the shape of the edge (if present in the block) is described by a bitmap. Another known imaging system uses an 8×8 block and the shape of the edge is encoded according to the entry and exit points of the edge relative to the block. The actual edge shape can be found in a table indexed by the edge entry and exit positions. The shapes of characters are also stored in a table of font rasters.

These types of image representations are particularly well-suited to performing trapping operations because calculations about where trapping is needed, determinations of which colors to use along the edge and calculations to determine the shape of the edge are carried out efficiently on the tables referenced according to the image buffer encoding, rather than on the image buffer itself. The tables have a small number of entries relative to the number of pixels in the image buffer.

As such, according to the present invention, an enhanced decoding process to support a trapping operation is provided. In this regard, once it is determined that an edge is present in a selected image block, stored color pairs corresponding to the colors that define the edge are evaluated to determine if any such pairs require trapping. If a table entry has colors that need trapping, it can be marked to indicate this fact (as an entry in the table or through an auxiliary data structure) and the intermediate trapping color or colors can be determined. For ease of processing, however, the trapping color is preferably stored as an additional entry in the color table. The shape of the pixels along the edge that require the trapping color can either be calculated or determined by using a table look-up. The decoding process then assembles the final expanded block including the trapping region.

Figure 3:
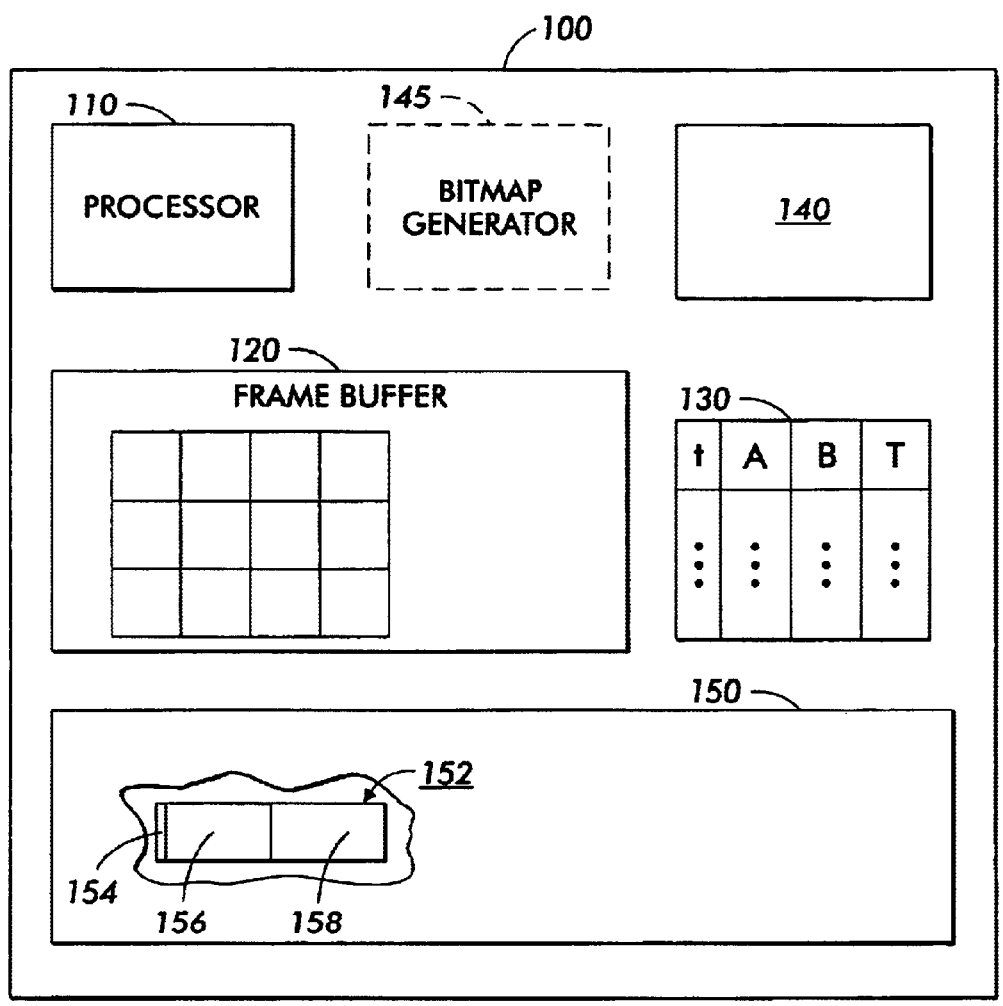
FIG. 3 is a block diagram of a system according to the present invention.

Referring now to the drawings wherein the showings are for purposes of illustrating the preferred embodiments of the invention only and not for purposes of limiting same, FIG. 3 provides a view of an overall preferred system according to the present invention. As shown, the system 100 includes a processor 110, a frame buffer 120, a first look-up table 130, and a second look-up table 140. As an alternative to the second look-up table 140, a bit map generator 145 is provided. Also included in the system is a suitable memory 150 to accommodate, among other functions well known to those skilled in the art, storage of the encoded words (shown for example at 152) associated with each picture element or block.

Preferably, the above-described system is used for processing a digital image comprised of picture elements. Specifically, the processing performed is a trapping operation to augment the decoding process of the system. In addition, it should be appreciated that the image of interest has present therein at least one edge defined by a transition from a first color to a second color.

Figure 1:
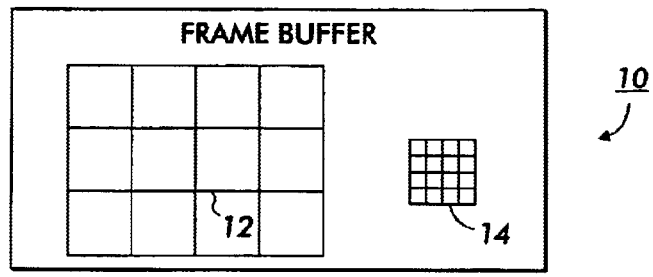
FIG. 1 is a schematic illustration of a prior art frame buffer.
Figure 2A:
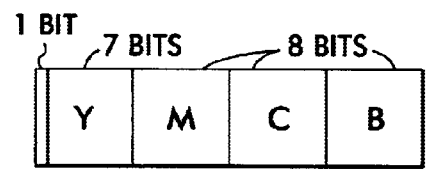
FIGS. 2A–2C are illustrations of operations of frame buffers of the prior art.
Figure 2B:
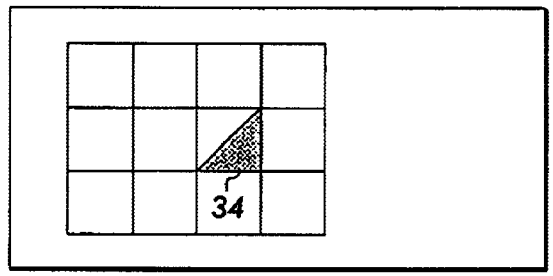
Figure 2C:
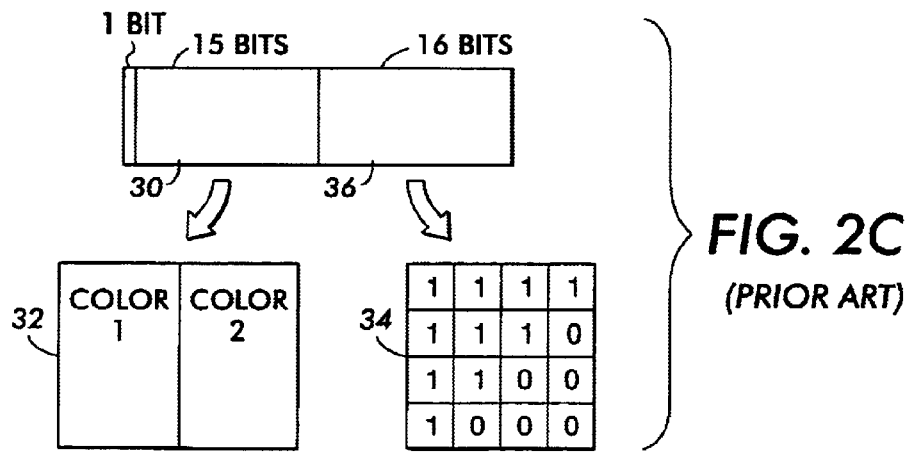

More specifically, the frame buffer 120 is operative to store a plurality of the blocks or picture elements, as shown for example in FIG. 1. The picture elements are preferably encoded to indicate whether the edge is present in the each picture element. This, of course, is accomplished by providing a flag bit (shown at 154 in FIG. 3) as the first bit of the 32-bit word used to describe the selected block. Setting the flag bit during the encoding process is an indication that an edge is present in the image. Resetting the flag bit during the encoding is an indication, however, that no edge is present in the image and processing well known in the art is consequently performed on the block of the image.

It should be appreciated by those skilled in the art that the encoding of the picture elements may be accomplished using a variety of well known techniques. The encoding, however, should be performed in such a manner so as to attain the goals of the present invention.

The first table 130 has stored therein data on a plurality of colors. In this regard, the table is configured such that pairs of the plurality of colors A and B are each associated with a trapping color T. A trapping indicator or tag t is also provided in the table. The table is, of course, selectively addressable based on the encoded picture elements. Specifically, 15 bits of the encoded words (shown in exemplary fashion at 156 of FIG. 3) are used to address the first table 130.

The second table 140 has stored therein bitmap information. The second table is also selectively addressable to obtain bit maps based on the encoded picture elements. The bitmap generator 145 is operative to selectively generate bit maps based on the encoded picture elements. Preferably, the last 16 bits (shown in exemplary fashion at 158 of FIG. 3) of the encoding words are used for these purposes.

Those of skill in the art will appreciate that other data structures or "on the fly" calculations (if sufficient processing speed is available) may be employed to supplement or as an alternative to the preferred embodiment.

The processor 110 is operative to determine whether a selected picture element has the edge present therein based on the encoding, determine the colors present in the selected picture element based on the encoding and the pairs of colors stored in the table, determine whether a trapping operation should be performed based on the colors determined to be present in the picture element and the pairs stored in the table, determine which trapping color should be used for the trapping operation based on the pairs of colors stored in the table and the trapping color associated with the each pair of colors stored in the table, and perform the trapping operation based on the trapping color and a one of the generated bit maps. It is to be appreciated that the processor 110 preferably performs these functions according to the present invention, as well as the method described in connection with FIG. 4, using well-known software and hardware techniques. It is also to be appreciated that the processor 110 may take a modified form if the preferred embodiment were modified with respect to data structures other than the tables and the provision of additional "on the fly" calculations.

Figure 4:
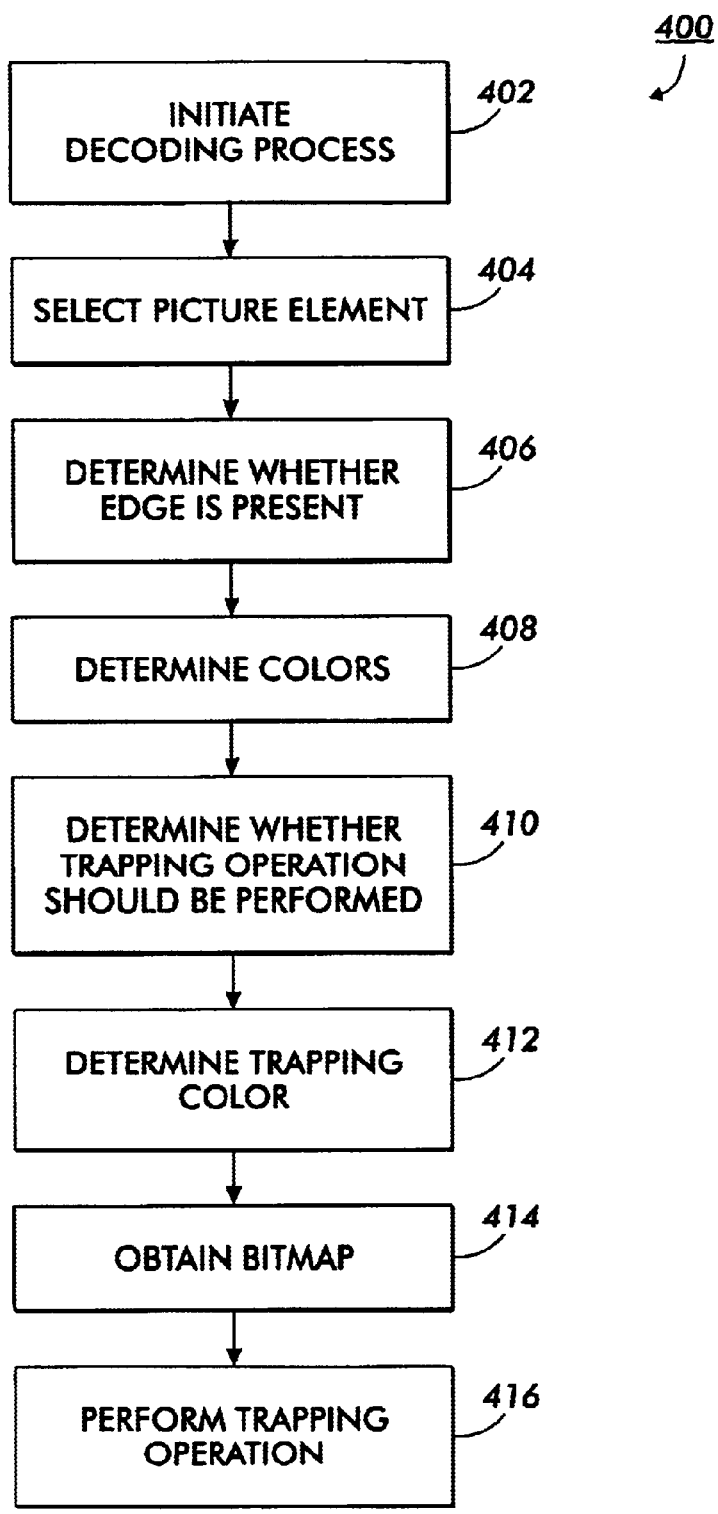
FIG. 4 is a flowchart illustrating a method according to the present invention.

Referring now to FIG. 4, the overall method 400 according to the present invention is illustrated. As shown, a decoding process is first initiated (step 402). A picture element or a block of the image that is stored in the frame buffer is then selected for evaluation (step 404). It is then initially determined whether the selected picture element has an edge present therein based on the encoding (step 406). Colors in the selected picture element are subsequently determined based on the encoding and pairs of stored colors in, for example, the table 130 (step 408).

A determination is made as to whether a trapping operation should be performed based on the colors determined to be present in the selected picture element and the stored pairs (step 410). Of course, it is to be appreciated by those skilled in the art that such determinations could be made and stored in, for example, a look-up table such as table 130. Indeed, such pre-calculation and storage of the results is a preferred form of the invention. The colors are preferably represented in device coordinates (to take into account the undercolor) and the processing to determine if trapping is required takes place after any color correction process, as an initial step of the decoding stage.

Nonetheless, trapping is typically only needed for high-contrast edges printed with substantially different inks. Therefore, whether the determination to perform a trapping operation is pre-calculated and stored or calculated "on the fly," the similarity of colors can be tested at suitable times by evaluating the absolute differences in corresponding color components. For example, if the absolute difference of any component is greater than a threshold e, then trapping is unnecessary. (The threshold e is typically about half of the maximum value.)

In known systems, colors are represented as the four consecutive bytes of a 32-bit word (YMCK). (Actually, certain known systems use a 7-bit value for Y as illustrated above whereas the following assumes 8-bit values for all components.) With this representation, the test can be conducted very efficiently, for example, by word operations in the C language as follows:

Let the two colors be A and B, their difference C is given by

C=(A|0'01010101)-(B & 0xfefefefe); if (((C & C>>1)) & 0x80808080)!=0) /*then we do not need to trap*/

One can also avoid trapping if the sum of all the absolute differences of the components is greater than some threshold f. For example, the test might be carried out as follows:

```
    S = (C>>1) & (0x80808080); S| = S>>1; S| = S>>2; S| =
S>>4; C   = S;
    if ((C & 0xff) + ((C>>8) & 0xff) + ((C>>16) & 0xff) +
((C>>24) & 0xff)> f)
        /*then we do not need to trap*/
```

Another situation where trapping is not needed is where one of the colors is quite light. A test for this would be that all of its color components are below some threshold value g. An exemplary test for every component of color A less than an eighth the maximum value is as follows:

if (((A|(A<<1)(A<<2)) & 0x80808080)==0) /*then we do not need to trap*/

A similar test can be performed on color B.

Special trapping circumstances occur when one of the colors is black because other inks can be overprinted with black without greatly changing the appearance except to make it a little darker. Because we can take advantage of this, we may always trap when one of the colors is black unless the other color is white (or gray). For example, a test for this (assuming black is in the least significant byte) is as follows:

if ((((A & 0xFF)==0xFF) && ((B & 0xFFFFFF00)!=0)) ||(((B & 0xFF)==0xFF) && ((A & 0xFFFFFF00)?=0))) /*then trapping should take place*/

If a trapping operation is to be performed, a trapping color to be used for the trapping operation is selected based on the pairs of colors stored in the table and a stored trapping color associated with the each stored pair (step 412). A trapping region can be formed on either one or both sides of an edge and either one or two colors may be used. A simple choice of color, for example, is the average between the two colors A and B. This can be done if neither A nor B is black. The color could be used on either one or both sides of the edge. When the color components are represented by the four bytes of a 32-bit word, the average color can be calculated and stored at a suitable time as follows:

$$T=((A>>1) \text{ \& } 0x7f7f7f7f)+((B>>1) \text{ \& } 0x7f7f7f7f);$$

An exception to this choice of trapping color is the case where one of the colors is black. There are two things to do when trapping against black. One is to combine the inks of the non-black color with the black ink in the trapping region. These inks won't be seen under the black and if mis-registration occurs, they will fill in the gap. The second is to remove any ink intentionally overprinted with black to make it darker. On mis-registration, these inks could extend beyond the black and become visible. Both these actions can be done by/in a simple operation. If A is the color containing solid black, then the trapping color should be $$T=(B|0xff);$$

This color should be applied only along the black side of the edge.

Once the trapping color is deteremined, a bitmap is also subsequently obtained according to the encoding (step 414). In this regard, to complete the trapping of an edge, the shape of the trapping region must be determined. This can be calculated by logical operations on the edge bitmap that is obtained via, for example, table look-up or generated. The trapping region along the side of the edge where the bitmap value is 1 can be found by eroding the bitmap and XORing with the original bitmap. If p(i, j) is the value of the bitmap at position (i, j) then the trapping region on one side of the edge in the notation of symbolic logic is $$P(i, j) \wedge \cdot (p(i+1,j) \wedge p(i-1,j) \wedge p(i, j+1) \wedge p(i,j-1))$$

Certain known imaging systems have the advantage that the bitmaps for graphics and text are found by table look up when decoding. Therefore, the trapping regions can be pre-computed and also stored in a table. During the decoding, the bitmap of the trapping region for the block is simply looked up in an table. As an alternative, to save storage space, the combined bitmap for the trapping region on both sides of an edge could be stored and the region for one side or the other could be recovered by ANDing with the original edge bitmap or its complement.

For text, trapping regions could be stored for only those characters that are found with colors needing trapping. Otherwise, the size of the font table may become larger than one would like. A way to do this is to pass through the image buffer after the color table has been processed for trapping colors. For any character reference in the image buffer one can look at the color table to see if trapping is needed. If so, and if the trapping region has not already been computed, the trapping region can be formed and stored for the character. The text processing can be combined with the solid block processing described below.

Other known imaging schemes explicitly store the 4×4 bitmap in the encoding. As such, the trapping region must be calculated at the time the block is decoded (instead of pre-calculated and stored in a table as for the aforementioned known systems). However, since the bitmap fits into a single 16-bit word, the calculation can be done very quickly. For a bitmap word P a one bit wide trapping region on one side of the edge is given by:

$$R=P \text{ \&}^\sim (((P<<1)|0x1111) \text{ \& } ((P>>1)|0x8888) \text{ \& } ((P<<4)|0xf) \text{ \& } ((P>>4)|0xf000));$$

For the one-bit wide trapping region along the other side of the edge, P is complemented before applying the above calculation.

Given the trapping color and a bitmap for the shape of the trapping region, the trapped edge can be easily formed as part of the decoding process. The trapping operation is then performed based on the trapping color and a one of the generated bit maps (step 416).

As an alternative, it may be advantageous to avoid trapping of a thin stroke because the trapping can alter its apparent width and color. In known imaging systems that use an identifiable encoding for strokes, such avoidance is particularly applicable. In such embodiments, the system would refrain from trapping blocks with the stroke encoding or trap only if the stroke width is greater than some threshold.

In an alternative embodiment, the methods and systems described above can be extended to apply to situations where three-colors are present in a picture element or block to define edges. To extend trapping to the three-color case, colors, i.e. color pairs defining an edge, should be evaluated—either pre-calculated and stored or evaluated as needed—to determine where trapping is needed. If trapping should be done for two of the colors, the trap color for this pair can be determined as described above. The shape of the trapping region must also be determined for blocks that reference the three colors. If p(i, j) and q(i, j) are the values of the shape bitmaps for the two colors for some block, then the region within bitmap p that borders q is given by $$p(i, j) \wedge (q(i+1,j) \vee q(i-1,j) \vee q(i, j+1) \vee q(i,j-1))$$

The region within q can be found by exchanging p and q in the above expression.

A further embodiment takes into account that, while most edges are encoded as edge blocks, horizontal or vertical edges that lie along block boundaries also exist. In this case, there is no need to reference a color table to determine colors because the two colors are stored in the image buffer. To perform a trapping operation in these circumstances, the image buffer must be evaluated, or stepped through, to locate the cases where trapping is needed. This can either be done in conjunction with the decoding or as a prepass. Preferably, this is accomplished on only 1/16 or 1/64 of the image resolution. To determine if trapping is needed, the color test described above is applied to the color of the block and each of its four neighbors. If this is done in a pass prior to the decoding, then the block can be handled by replacing it with an edge block with the edge lying along the boundary and the colors those of the block and its neighbor.

Known imaging systems have an edge encoding that is suitable to this case. In one known system, a horizontal (and a vertical) "high-resolution-edge" encoding is provided where the edge is specified as one of 16 positions on each column (row) of the block. This encoding allows the edge to be placed on the top or bottom (left or right) for all four columns (rows). The result is a solid block with an edge specified along its border. This case can be used to identify a solid block in need of trapping.

In another known system, edges are specified by their entry and exit points and it is valid to have an edge that enters in one corner and exits at another. This can represent a solid block with trapping along a boundary.

Another case involves a solid block positioned next to an edge block with a color change at the boundary. This situation may be handled, as those of skill in the art will appreciate, by selectively applying the above techniques during the decoding stage.

The above description merely provides a disclosure of particular embodiments of the invention and is not intended for the purposes of limiting the same thereto. As such, the invention is not limited to only the above described embodiments. Rather, it is recognized that one skilled in the art could conceive alternative embodiments that fall within the scope of the invention.

Having thus described the invention, I hereby claim:

1. An apparatus useful for processing a digital image comprised of picture elements, the image having present therein at least one edge defined by a transition from a first color to a second color, the apparatus comprising:
   a frame buffer operative to store a plurality of the picture elements, the picture elements each being encoded to indicate whether the edge is present in the each picture element;
   a table having stored therein data on a plurality of colors, the table being configured such that pairs of the plurality of colors are each associated with a trapping color and the table being selectively addressable based on the encoded picture elements;
   a bitmap generator operative to selectively generate bit maps based on the encoded picture elements;
   a processor operative to determine whether a selected picture element has the edge present therein based on the encoding, determine the colors present in the selected picture element based on the encoding and the pairs of colors stored in the table, determine whether a trapping operation should be performed based on the colors determined to be present in the picture element and the pairs stored in the table, determine which trapping color should be used for the trapping operation based on the pairs of colors stored in the table and the trapping color associated with the each pair of colors stored in the table, and perform the trapping operation based on the trapping color and a one of the generated bit maps.

2. The apparatus as set forth in claim 1 wherein the picture elements are encoded with a flag bit to indicate whether the edge is present.

3. The apparatus as set forth in claim 1 wherein the pairs are determined to require trapping based on a comparison of absolute differences to a threshold.

4. The apparatus as set forth in claim 1 wherein the trapping color is determined based on an average of the pair associated therewith.

5. The apparatus as set forth in claim 1 wherein the bitmap generator generates bit maps by means of logical operations on bitmaps associated with the encoded picture elements.

6. An apparatus useful for processing a digital image comprised of picture elements, the image having present therein at least one edge defined by a transition from a first color to a second color, the apparatus comprising:
   a frame buffer operative to store a plurality of the picture elements, the picture elements each being encoded to indicate whether the edge is present in the each picture element;
   a first table having stored therein data on a plurality of colors, the first table being configured such that pairs of the plurality of colors are each associated with a trapping color and the table being selectively addressable based on the encoded picture elements;
   a second table having stored therein bitmap information, the second table being selectively addressable to obtain bit maps based on the encoded picture elements;
   a processor operative to determine whether a selected picture element has the edge present therein based on the encoding, determine the colors present in the selected picture element based on the encoding and the pairs of colors stored in the first table, determine whether a trapping operation should be performed based on the colors determined to be present in the selected picture element and the pairs stored in the first table, determine which trapping color should be used for the trapping operation based on the pairs of colors stored in the first table and the trapping color associated with the each pair of colors stored in the first table, and perform the trapping operation based on the trapping color and a bit map.

7. The apparatus as set forth in claim 6 wherein the picture elements are encoded with a flag bit to indicate whether the edge is present.

8. The apparatus as set forth in claim 6 wherein the pairs are determined to require trapping based on a comparison of absolute differences to a threshold.

9. The apparatus as set forth in claim 6 wherein the trapping color is determined based on an average of the pair associated therewith.

10. A method for processing a digital image represented by a set of encoded words, each encoded word associated with and describing a respective block of pixels from an array of blocks that makes up the digital image, the image having present therein at least one edge defined by a transition from a first color to a second color, the encoded words indicating whether the edge is present in each block, the method comprising:
    determining whether a selected block has the edge present therein based on the associated encoded word;
    determining colors present in the selected block based on the encoded word;
    determining whether a trapping operation should be performed based on the colors determined to be present in the selected block based on the encoded word;
    determining a trapping color to be used for the trapping operation based on a table containing pairs of colors wherein each pair is associated with a trapping color and the table is selectively addressable based on the encoded word;
    obtaining a bitmap based on the encoded word indicating a shape of the edge; and,
    performing the trapping operation based on the trapping color and the obtained bit map.

11. The method as set forth in claim 10 wherein determining whether the selected block has the edge present therein comprises checking the status of a flag bit.

12. The method as set forth in claim 10 wherein obtaining the bitmap comprises generating the bitmap based on the encoding.

13. The method as set forth in claim 10 wherein obtaining the bitmap comprises accessing a look-up table based on the encoding.

* * * * *